(12) United States Patent
Gharda

(10) Patent No.: US 10,519,315 B2
(45) Date of Patent: Dec. 31, 2019

(54) QUINACRIDONE PIGMENT AND A PROCESS FOR PREPARATION THEREOF

(71) Applicant: Keki Hormusji Gharda, Mumbai (IN)

(72) Inventor: Keki Hormusji Gharda, Mumbai (IN)

( * ) Notice: Subject to any disclaimer, the term of this patent is extended or adjusted under 35 U.S.C. 154(b) by 0 days.

(21) Appl. No.: 16/301,210

(22) PCT Filed: May 12, 2017

(86) PCT No.: PCT/IB2017/052796
§ 371 (c)(1),
(2) Date: Nov. 13, 2018

(87) PCT Pub. No.: WO2017/195158
PCT Pub. Date: Nov. 16, 2017

(65) Prior Publication Data
US 2019/0177547 A1    Jun. 13, 2019

(30) Foreign Application Priority Data

May 13, 2016 (IN) .............................. 201621016839

(51) Int. Cl.
*C07D 471/04* (2006.01)
*C09B 48/00* (2006.01)

(52) U.S. Cl.
CPC .................................. *C09B 48/00* (2013.01)

(58) Field of Classification Search
CPC .................................................... C07D 471/04
USPC ............................................................ 546/49
See application file for complete search history.

(56) References Cited

FOREIGN PATENT DOCUMENTS

| | | | | |
|---|---|---|---|---|
| JP | 62149493 A | * | 7/1987 | ........... C07D 471/04 |
| WO | 94/10249 | | 5/1994 | |
| WO | 2004/067642 | | 8/2004 | |
| WO | 2007/060254 | | 5/2007 | |

OTHER PUBLICATIONS

International Search Report issued in co-pending International Application No. PCT/IB2017/052796 dated Jul. 14, 2017.

* cited by examiner

*Primary Examiner* — Charanjit Aulakh
(74) *Attorney, Agent, or Firm* — Whiteford, Taylor & Preston, LLP; Peter J. Davis

(57) ABSTRACT

The present disclosure relates to Quinacridone pigment and a process of preparation thereof. The Quinacridone pigment of the present disclosure exhibit higher chemical resistance to solvents, higher stability and higher resistance to acid and alkali.

16 Claims, No Drawings

QUINACRIDONE PIGMENT AND A PROCESS FOR PREPARATION THEREOF

FIELD

The present disclosure relates to quinacridone pigments.

DEFINITIONS

As used in the present disclosure, the following terms are generally intended to have the meaning as set forth below, except to the extent that the context in which they are used indicate otherwise.

Resist salt: The term, "resist salt" refers to Meta Nitrobenzene Sulphonic Acid, which acts as a mild oxidizing agent.

BACKGROUND

Quinacridone pigments exhibit strong reddish and bluish magenta shade, have excellent heat and light resistance, and outstanding tinctorial strength. A crude quinacridone pigment compound powder is dull brown in colour and has no pigmentary value. The crude quinacridone pigment compound after finishing, gives strong reddish-yellow or reddish-blue shade. Quinacridone pigments can be used in various applications such as plastics, inks, coatings and the like.

Substituted and un-substituted Quinacridone pigment compounds are commonly prepared by oxidation of the corresponding dihydroquinacridones in the crude form, the crude quinacridone pigment compounds can be converted to the desired pigment by suitable finishing process, such as milling and contacting with phase-directing organic compounds.

There is provided herein a quinacridone pigment and a process for its preparation.

OBJECTS

Some of the objects of the present disclosure, which at least one embodiment herein satisfies, are as follows:

An object of the present disclosure is to provide a quinacridone pigment.

Another object of the present disclosure is to provide a simple process for the preparation of a quinacridone pigment.

Other objects and advantages of the present disclosure will be more apparent from the following description, which is not intended to limit the scope of the present disclosure.

SUMMARY

In accordance with one aspect of the present disclosure, there is provided a Quinacridone pigment comprising 2,9-bis(isopropyl) quinacridone, represented by formula (I).

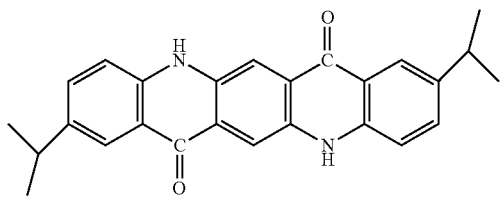

(I)

In accordance with another aspect of the present disclosure, there is provided a process for preparing the Quinacridone pigment comprising compound of Formula-I. The process comprises: condensing 4-isopropylaniline (II) and dimethyl succinylsuccinate (III) in at least one first fluid medium in the presence of at least one mineral acid catalyst, at a pressure in the range of 0.5 to 2.0 kg/cm$^2$, and at a temperature in the range of 65 to 90° C. to produce Dimethyl 2,5-bis(4-isopropylphenylamino)cyclohexa-1,4-diene-1,4-dicarboxylate (IV); heating Dimethyl 2,5-bis(4-isopropylphenylamino)cyclohexa-1,4-diene-1,4-dicarboxylate (IV), at a temperature in the range of 108 to 115° C., and a pressure in the range of 1.0 to 4.0 kg/cm$^2$, in the presence of resist salt, at least one alkali, and water to obtain alkali metal salt of 2,5-bis(4-isopropylphenylamino)benzene-1,4-dioic acid, which on acidification gives 2,5-bis(4-isopropylphenylamino)benzene-1,4-dioic acid (V); optionally, purifying 2,5-bis(4-isopropylphenylamino)benzene-1,4-dioic acid (V) by washing with at least one second fluid medium to obtain a purified 2,5-bis(4-isopropylphenylamino)benzene-1,4-dioic acid (V); followed by cyclization of the purified 2,5-bis(4-isopropylphenylamino)benzene-1,4-dioic acid (V) in the presence of predetermined amount of polyphosphoric acid at a temperature in the range of 90 to 150° C., for a second predetermined time period to obtain crude 2,9-bis(isopropyl)quinacridone (VI); and washing the crude 2,9-bis(isopropyl)quinacridone (VI) with at least one third fluid medium to obtain the quiniacridone pigment comprising 2,9-bis(isopropyl)quinacridone(I). The process as claimed in claim 2, wherein the first predetermined time period is in the range of 3 to 7 hours.

In accordance with the embodiments of the present disclosure, the at least one mineral acid catalyst is selected from the group consisting of sulfuric acid, hydrochloric acid and phosphoric acid.

In accordance with the embodiments of the present disclosure, the ratio of the amount of the resist salt and the amount of dimethyl succinylsuccinate (III) is in the range of 0.5:1 to 1:1.

In accordance with the embodiments of the present disclosure, the ratio of the amount of polyphosphoric acid and the amount of 2,5-bis(4-isopropylphenylamino)benzene-1, 4-dioic acid (V) is 3:1 to 7:1.

In accordance with the embodiments of the present disclosure, the first fluid medium and the second fluid medium are at least one, independently selected from the group consisting of dimethylacetamide, methanol, ethanol, propanol, isopropanol, water and mixture thereof.

In accordance with the embodiments of the present disclosure, the third fluid medium is at least one selected from the group consisting of isobutyl alcohol, dimethylacetamide, methanol, propanol, isopropanol, and water.

In accordance with the embodiments of the present disclosure, the ratio of the amount of 4-isopropylaniline (II) and the amount of dimethyl succinylsuccinate (III) is in the range of 2:1 to 4:1.

In accordance with the embodiments of the present disclosure, the ratio of the amount of dimethyl succinylsuccinate (III) and water is in the range of 1:300 to 1:900.

DETAILED DESCRIPTION

The present disclosure relates to a quinacridone pigment and a process for its preparation.

In accordance with one aspect of the present disclosure, there is provided a quinacridone pigment comprising 2,9-bis(isopropyl)quinacridone, represented by formula I.

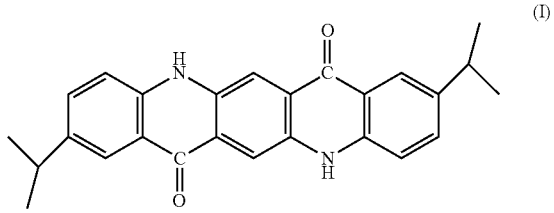 [SMILES: CC(C)c1ccc2[nH]c3cc4c(=O)c5cc(C(C)C)ccc5[nH]c4cc3c(=O)c2c1]

(I)

In accordance with another aspect of the present disclosure, there is provided a process for the synthesis of I. The process involves the following steps:

Step I: Condensation followed by Oxidation and Hydrolysis

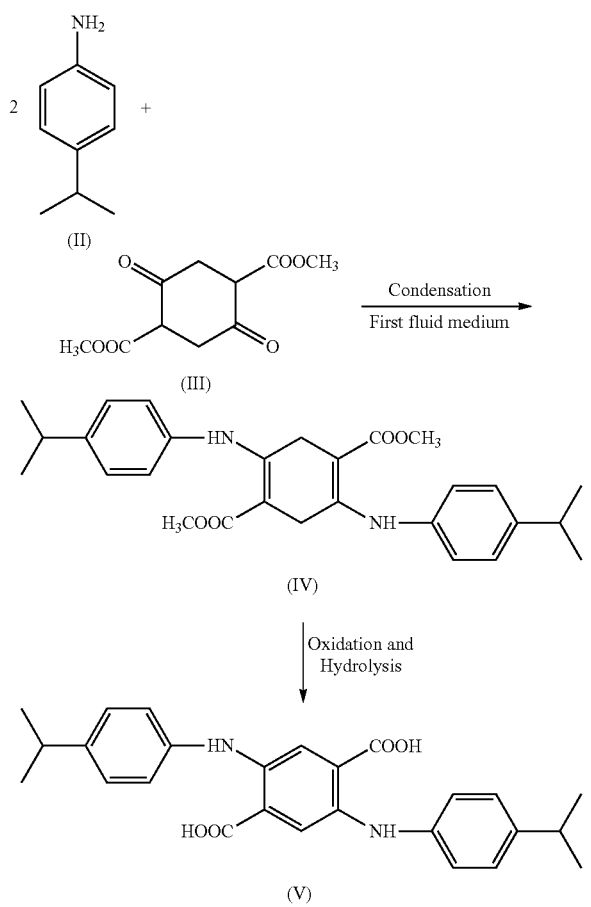

First, 4-isopropylaniline (II) is condensed with dimethyl succinylsuccinate (III) in a first fluid medium in the presence of at least one mineral acid catalyst at a pressure in the range of 0.5 to 2.0 kg/cm$^2$, and a temperature in the range of 65 to 90° C., for a first predetermined time period to yield Dimethyl 2,5-bis(4-isopropylphenylamino)cyclohexa-1,4-diene-1,4-dicarboxylate (IV).

Further, compound IV is heated at a temperature in the range of 108 to 115° C. in the presence of a resist salt (sodium-3-nitrobenzenesulfonate), at least one alkali and water, at a pressure in the range of 1.0 kg/cm$^2$ to 4.0 kg/cm$^2$, to obtain alkali metal salt of 2,5-bis(4-isopropylphenylamino)-1,4-dioic acid, which is acidified to obtain crude 2,5-bis(4-isopropylphenylamino)-1,4-dioic acid (V).

Optionally, compound V can be purified by washing with suitable fluid medium such as dimethylacetamide, methanol and water or mixture thereof.

In accordance with the embodiments of the present disclosure, the first predetermined time period is in the range of 3 to 7 hours.

In accordance with one embodiment of the present disclosure, the first predetermined time period is 5 hours.

In accordance with one embodiment of the present disclosure, the ratio of the amount of 4-isopropylaniline (II) and the amount of dimethyl succinylsuccinate (III) is 2.1:1.

Compound V is obtained with purity greater than 97%. Further, the structure of compound V is confirmed by proton NMR and mass spectroscopy.

In accordance with the embodiments of the present disclosure, the first fluid medium is at least one selected from the group consisting of methanol, ethanol, isopropanol, propanol, and butanol.

In accordance with the embodiments of the present disclosure, the mineral acid catalyst is at least one selected from the group consisting of sulfuric acid, hydrochloric acid, and phosphoric acid.

In accordance with one embodiment of the present disclosure, the mineral acid catalyst is sulfuric acid.

In accordance with the embodiments of the present disclosure, the ratio of the amount of 4-isopropylaniline (II) and the amount of dimethyl succinylsuccinate (III) is in the range of 2.:1 to 4:1

In accordance with one embodiment of the present disclosure, the ratio of the amount of 4-isopropylaniline (II) and the amount of dimethyl succinylsuccinate (III) is 2.1:1.

Resist salt acts as an oxidizing agent.

In accordance with one embodiment of the present disclosure, the molar ratio of the amount of the resist salt and the amount of dimethyl succinylsuccinate (III) is in the range of 0.5:1 to 1:1.

In accordance with one embodiment of the present disclosure, the the ratio of the amount of the resist salt and the amount of dimethyl succinylsuccinate (III) is 0.8:1.

In accordance with the embodiment of the present disclosure, the alkali is at least one selected from the group consisting of NaOH and KOH.

In accordance with one embodiment of the present disclosure, the alkali is NaOH.

In accordance with one embodiment of the present disclosure, the molar ratio of the amount of the alkali and the amount of dimethyl succinylsuccinate (III) is in the range of 3:1 to 7:1.

In accordance with the embodiments of the present disclosure, the ratio of the amount of dimethyl succinylsuccinate (III) and the amount of water is in the range of 1:300 to 1:900.

In accordance with one embodiment of the present disclosure, the ratio of the amount of dimethyl succinylsuccinate (III) and water is 1:500.

Step II: Cyclization of V

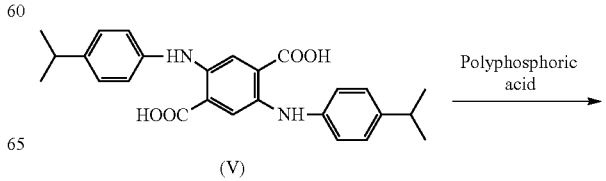

-continued

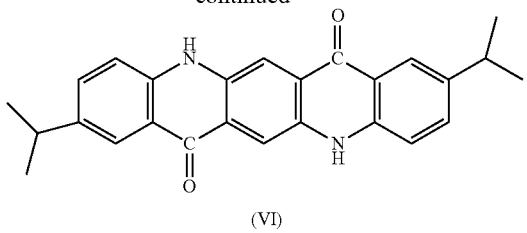

(VI)

Compound V is cyclized using polyphsophoric acid at a temperature in the range of 90 to 150° C. The step of cyclization is carried out for a time period in the range of 3 to 5 hours followed by drowning the reaction mixture in water to obtain a suspension containing a residue and a supernatant. The residue is separated and washed with water to yield crude quinacridone pigment compound VI.

In accordance with one embodiment of the present disclosure, the ratio of the amount of polyphosphoric acid and the amount of 2,5-bis(4-isopropylphenylamino)benzene-1, 4-dioic acid (V) is 3.5:1.

Step III: Purification

The crude quinacridone pigment compound (VI) is washed with at least one third fluid medium, and dried to obtain 2,9-bis(isopropyl)quinacridone pigment (I).

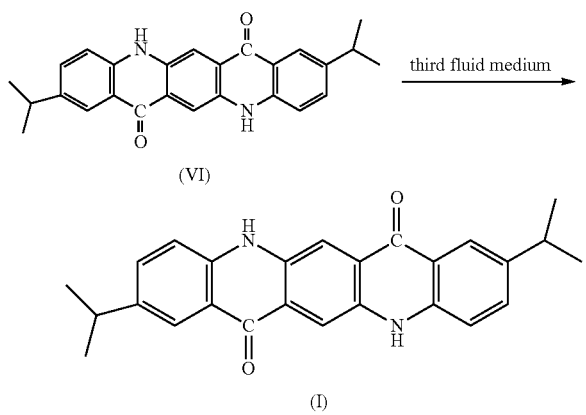

In accordance with the embodiments of the present disclosure, the third fluid medium is at least one selected from the group consisting of isobutyl alcohol, dimethylacetamide, methanol, propanol, isopropanol, and water.

In accordance with the embodiments of the present disclosure, the oil absorption value of 2,9-bis(isopropyl)quinacridone pigment I is 52 g per 100 g of the pigment.

The physical properties, fastness properties such as chemical resistance, solvent resistance and heat stability of the 2,9-bis(isopropyl)quinacridone pigment (I) were studied.

Pigment (I) was studied for acid and alkali resistance, and these properties are compared with that of commercial pigment red 122. The results are summarized in Table 1.

TABLE 1

Chemical Resistance to Acid and alkali.

| Properties Chemical Resistance (1-5 gray scale) | Result pigment I | Result pigment Red 122 |
|---|---|---|
| 2% Acid | 5 | 5 |
| 2% Alkali | 5 | 5 |

It was observed that both the pigments, I exhibited excellent resistance to an acid and an alkali, and the results for pigment I were comparable with commercial pigment red 122. The chemical resistance properties of 2,9-bis(isopropyl)quinacridone pigment were found to be 'very good' (in 2% hydrochloric and 2% sodium hydroxide)

Further, pigment I was studied for resistance to solvents and was these properties are compared with that of commercial pigment red 122. Table 2 summarizes the results for chemical resistance to solvents.

TABLE 2

Chemical resistances to solvents.

| Properties | Result* pigment I | Result* pigment Red 122 |
|---|---|---|
| Chemical Resistance (1-5 gray scale) 1 = poor, 4 = very good, 5 = excellent, | 1-5 scale | 1-5 scale |
| Mineral turpentine oil | 5 | 5 |
| Toluene | 5 | 5 |
| Butyl acetate | 5 | 5 |
| Methylethylketone(MEK) | 5 | 5 |
| Butanol | 5 | 5 |
| O-xylene | 5 | 5 |

*Chemical Resistance (1-5 gray scale) 1 = poor, 4 = very good, 5 = excellent.

The resistances to solvents were found to be very good to excellent for both of these pigments. The results for resistance to solvents were found to be comparable to that of commercial pigment red 122. solvent fastness (xylene, methylethylketone, n-butanol, methanol, toluene, butyl acetate and the like) were found to be 'very good' to 'excellent'

Weather fastness of pigment (I) was studied by exposing pigment (I) for 1000 hours in QUV test and the results are summarized in Table 3.

TABLE 3

Weather fastness of pigment (I) after 1000 hours exposure in QUV test for plastic application.

| Name | DL | Da | Db | DC | DH | DE | Color change | 1-5 scale gray scale rating |
|---|---|---|---|---|---|---|---|---|
| HDPE FT | −1.28 | −9.15 | 1.0 | −8.3 | 3.95 | 9.30 | 5.81 | 3 |
| HDPE TT | −3.19 | −12.97 | 7.15 | −12.85 | 7.40 | 15.17 | 11.92 | 3 |

HDPE: High density polyethylene and TT: Tint tone
DL* = difference in lightness/darkness value (+ = lighter − = darker)
Da* = difference on red/green axis (+ = more red − = more green)
Db* = difference on yellow/blue axis (+ = more yellow − = more blue)
DC* = difference in chroma (+ = bright − = dull)
DH* = difference in hue
DE* = total difference in color value It was observed that pigment I exhibit fair stability to weather fastness.

Further, pigment I was studied for light fastness and was compared with commercial pigment red 122. The results are summarized in Table 4.

TABLE 4

Light fastness (IS: 2454-RA2010) Blue wool Rating is carried out
(1 = very poor, 2 = poor, 3 = fair, 4 = fairly good, 5 = good,
6 = very good, 7 = excellent and 8 = outstanding).

| Sr. No | Test parameter for Full shade | 1-8 scale rating of Pigment I | 1-8 scale rating of Pigment red 122 |
|---|---|---|---|
| 1 | Color Fastness to Light (IS: 2454-RA2010) Blue wool Rating | 7-8 | 7-8 |

The Blue Wool Scale measures and calibrates the permanence of colouring dyes. Traditionally this test was developed for the textiles industry but it has now been adopted by the printing industry as measure of lightfastness of ink colourants and colourant industries.

The light fastness was found to be excellent to outstanding for both the pigments.

The L, a, b values of 2,9-bis(isopropyl)quinacridone pigment (VI) in paint application are L=42.96, a*=57.23, b*=30.99, C*=65.08 and h=28.44.

TABLE 5

Solvent paint colouristic results of pigments.

| Pigment | Test | L* | a* | b* | C* | h* |
|---|---|---|---|---|---|---|
| Pigment Red 122, 5% pigment loading | AD paint | 35.29 | 45.54 | 14.16 | 47.22 | 17.45 |
| Pigment I, 5% pigment loading | AD paint | 42.02 | 54.71 | 28.69 | 61.78 | 27.67 |

It was observed that 'L', 'A', 'B' values for pigment I reveals that the pigment (I) is more redder-yellower with high chroma as compared to commercial pigment red 122. The paint draw-downs (Aqueous paint (AQP)/Air Drying Paint (ADP)) of pigment I are cleaner, and brighter than the commercial pigment red 122.

It was observed that, the pigment I was stable at a temperature greater than 300° C. The thermal stability of pigment as compared to quinacridone pigment Red 122 and pigment violet 19.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTS DETAILS

Experiment 1: Preparation of 2,5-bis(isopropylphenylamino)benzene-1,4-dioic acid (V)

A 2 liter autoclave was charged with methanol (1440 g, 45.0 mole), p-cumidine (283.5 g, 2.1 mole), sulfuric acid (4.5 g, 0.0465 mole) and dimethyl 2,5-dioxocyclohexane-1,4-dicarboxylate (DMSS) (228 g 1.0 mole) to obtain a first mixture. The first mixture was heated at 78° C. and pressure of 1.2 kg/cm² for 5 hours. The reaction progress was monitored by TLC. After the completion of the reaction, the first mixture was cooled to room temperature, and resist salt (198 g, 0.88 mole), caustic lye (342 g, 4.10 mole) and water (7000 g) were added to it to obtain a second mixture. The second mixture was heated to 115° C. at a pressure of 3.2 kg/cm² for 5 hours. After completion of reaction, the second mixture was diluted with water, filtered. Sulfuric acid was added to the filtrate to obtain a precipitate. The precipitate was washed with water till neutral pH was detected and the washed precipitate was dried to yield 2,5-bis(isopropylphenylamino)benzene-1,4-dioic acid (V), 390-399 g (90 to 92%)). HPLC analysis showed a purity of 98.5%.

LCMS of compound V showed molecular weight of 432.

The FTIR spectra of V displayed an absorption band at 3363 cm$^{-1}$, which indicated stretching of NH, a band at 2959 cm$^{-1}$, indicated the presence of hydroxyl of COOH group and a band at 1655 cm$^{-1}$ indicated the presence of carbonyl of COOH group.

$^1$H-NMR of V was recorded in DMSO-d$_6$ as a solvent. The spectrum showed a doublet at δ 1.17-1.21 corresponding to 12 protons of four methyl groups (position 1, 2, 19, 20 in structure (V)) of isopropyl group; a multiplate at δ 2.74-2.94 cm$^{-1}$ corresponding to two —CH protons (position 3, 8); a doublet at δ 7.10-7.17 corresponding to four protons of aromatic proton (position 4, 6, 15, 17); a doublet at δ 7.06-7.21 corresponding to two protons of aromatic proton (position 5, 7, 14, 16); a singlet at δ 7.82 corresponding to two protons of aromatic proton (position 10, 12); a broad signal at δ 8.80 corresponding to two protons of NH group (position 8, 13); and a broad signal at δ 13.4 corresponding to two protons of NH group (position 9, 11). Structure of compound (V) was thus confirmed by NMR spectra.

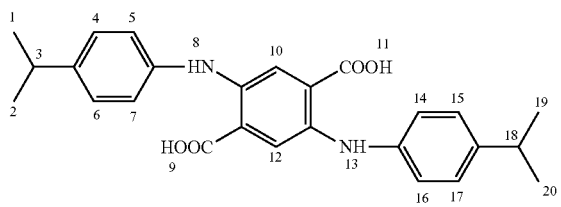

(V)

Experiment 2: Cyclisation of 2,5-Bis(isopropylphenylamino)benzene-1,4-dioic acid One liter capacity three neck resin kettle was charged with 700 g polyphosphoric acid (114-116%) under continuous stirring and heated slowly to 90° C. 200 g of 2,5-bis (isopropylphenylamino) benzene-1,4-dioic acid (V) was added to the kettle. After the addition of (V), the reaction mass was heated to 122° C. for three hours followed by drowning the reaction mass in cold water to obtain a slurry. The slurry was filtered, washed with water, 10% soda ash solution was added till the pH becomes neutral to obtain the crude pigment (VI) in 95-96% yield (175 g) having solid content in the range of 22-28%.

Crude compound (VI) after drying appeared in dull shade in Muller application and has no color value. So pigmentation with various solvents like methanol, isobutyl alcohol, dimethylacetamide and water or mixture thereof, was carried out to yield the pigment I.

2,9-bis(isopropyl)quinacridone is characterized in that the elemental analysis has values as given in Table 6.

TABLE 6

| Elemental analysis | | | |
|---|---|---|---|
| Elemental analysis | % C | % H | % N |
| Theoretical | 78.68 | 6.05 | 7.06 |
| Observed | 77.86 | 5.90 | 7.14 |

It was found that the theoretical values of C, H and N of 2,9-bis(isopropyl)quinacridone matches with the observed values.

2,9-bis(isopropyl)quinacridone is further characterized by an absorption band at 3431 $cm^{-1}$ in the FTIR spectra, which indicates the presence of —NH stretching and an absorption band at 1632 $cm^{-1}$, indicates the presence of carbonyl group.

Experiment 3: Purification

The crude wet cake (22-28% solid content) of the 2,9-bis(isopropyl)quinacridone (VI) was washed with ten to fifteen times of various solvents like isobutyl alcohol, dimethylacetamide, methanol and water or mixture thereof to yield finish pigment 2,9-bis(isopropyl)quinacridone I.

Technical Advancements

The present disclosure described herein above has several technical advantages including, but not limited to, the realization of:

a quinacridone pigment; and a simple process for the production of the quinacridone pigment.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing Quinacridone pigment comprising 2,9-bis(isopropyl)quinacridone of Formula (I);

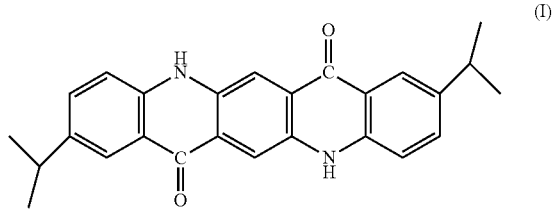 [SMILES: CC(C)c1ccc2[nH]c3cc4c(=O)c5cc(C(C)C)ccc5[nH]c4cc3c(=O)c2c1]

said process comprising the following steps:

i) condensing 4-isopropylaniline (II) and dimethyl succinylsuccinate (III) in at least one first fluid medium, in the presence of at least one mineral acid catalyst, at a pressure in the range of 0.5 $kg/cm^2$, and at a temperature in the range of 65 to 90° C. for a first predetermined time period to produce Dimethyl 2,5-bis(4-isopropylphenylamino)cyclohexa-1,4-diene-1, 4-dicarboxylate (IV), heating said Dimethyl 2,5 -bis (4-isopropylphenylamino)cyclohexa-1,4-diene-1,4-dicarboxylate (IV), at a temperature in the range of 108 to 115° C., and at a pressure in the range of 1.0 to 4.0 $kg/cm^2$, in the presence of resist salt, at least one alkali, and water to obtain alkali metal salt of 2,5-bis(4-isopropylphenylamino)benzene-1,4-dioic acid, which on acidifying provides crude 2,5-bis(4-isopropylphenylamino)benzene-1,4-dioic acid (V) and optionally, purifying said crude 2,5-bis(4-isopropylphenylamino)benzene-1,4-dioic acid (V) by washing with a second fluid medium to obtain 2,5-bis(4-isopropylphenylamino)benzene-1,4-dioic acid (V);

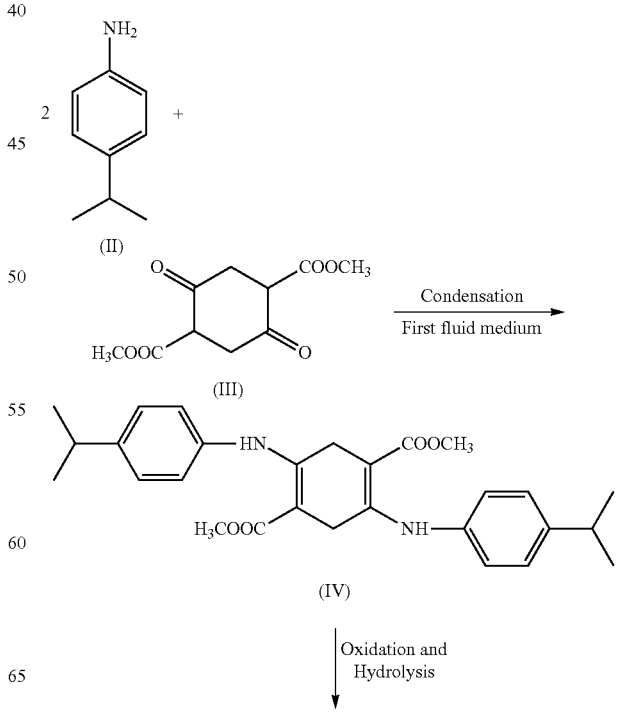

-continued

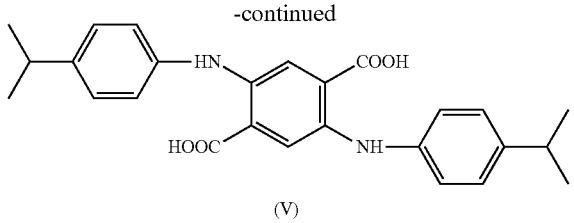

(V)

ii) cyclizing said 2,5-bis(4-isopropylphenylamino)benzene-1,4-dioic acid (V) in the presence of predetermined amount of polyphosphoric acid at a temperature in the range of 90 to 150° C., for a predetermined time period to obtain crude 2,9-bis(isopropyl)quinacridone (VI);

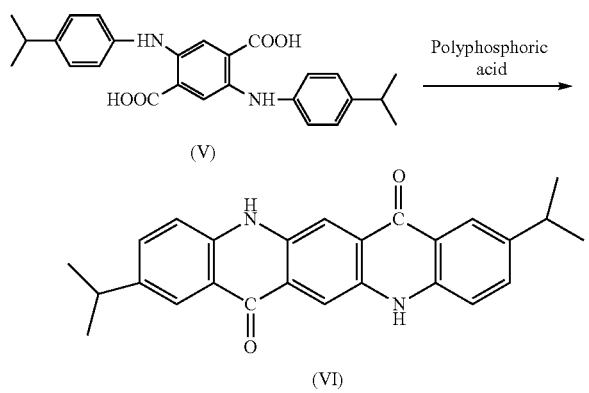

and iii) washing said crude 2,9-bis(isopropyl)quinacridone (VI) with at least one third fluid medium, and drying to obtain 2,9-bis(isopropyl)quinacridone (I).

2. The process as claimed in claim 1, wherein said first predetermined time period is in the range of 3 to 7 hours.

3. The process as claimed in claim 1, wherein said first predetermined time period is 5 hours.

4. The process as claimed in claim 1, wherein said at least one mineral acid catalyst is selected from the group consisting of sulfuric acid, hydrochloric acid and phosphoric acid.

5. The process as claimed in claim 1, wherein said at least one mineral acid catalyst is sulfuric acid.

6. The process as claimed in claim 1, wherein the ratio of the amount of said resist salt and the amount of dimethyl succinylsuccinate (III) is in the range of 0.5:1 to 1:1.

7. The process as claimed in claim 1, wherein the ratio of the amount of said resist salt and the amount of dimethyl succinylsuccinate (III) is 0.8:1.

8. The process as claimed in claim 1, wherein the ratio of the amount of polyphosphoric acid and the amount of 2,5-bis(4-isopropylphenylamino)benzene-1,4-dioic acid (V) is 3:1 to 7:1.

9. The process as claimed in claim 1, wherein the ratio of the amount of polyphosphoric acid and the amount of 2,5-bis(4-isopropylphenylamino)benzene-1,4-dioic acid (V) is 3.5:1.

10. The process as claimed in claim 1, wherein said first fluid medium and said second fluid medium are at least one, independently selected from the group consisting of dimethylacetamide, methanol, ethanol, propanol, isopropanol and mixture thereof.

11. The process as claimed in claim 1, wherein said first fluid medium is methanol and said second fluid medium is water.

12. The process as claimed in claim 1, wherein said third fluid medium is at least one selected from the group consisting of isobutyl alcohol, dimethylacetamide, methanol, propanol, isopropanol, and water.

13. The process as claimed in claim 1, wherein the ratio of the amount of 4-isopropylaniline (II) and the amount of dimethyl succinylsuccinate (III) is in the range of 2.1:1 to 4:1.

14. The process as claimed in claim 1, wherein the ratio of the amount of 4-isopropylaniline (II) and the amount of dimethyl succinylsuccinate (III) is 2.1:1.

15. The process as claimed in claim 1, wherein the ratio of the amount of dimethyl succinylsuccinate (III) and water is in the range of 1:300 to 1:900.

16. The process as claimed in claim 1, wherein the ratio of the amount of dimethyl succinylsuccinate (III) and water is 1:500.

* * * * *